R. L. ELLERY.
ADJUSTABLE REAMER.
APPLICATION FILED AUG. 17, 1912.
1,077,463.
Patented Nov. 4, 1913.
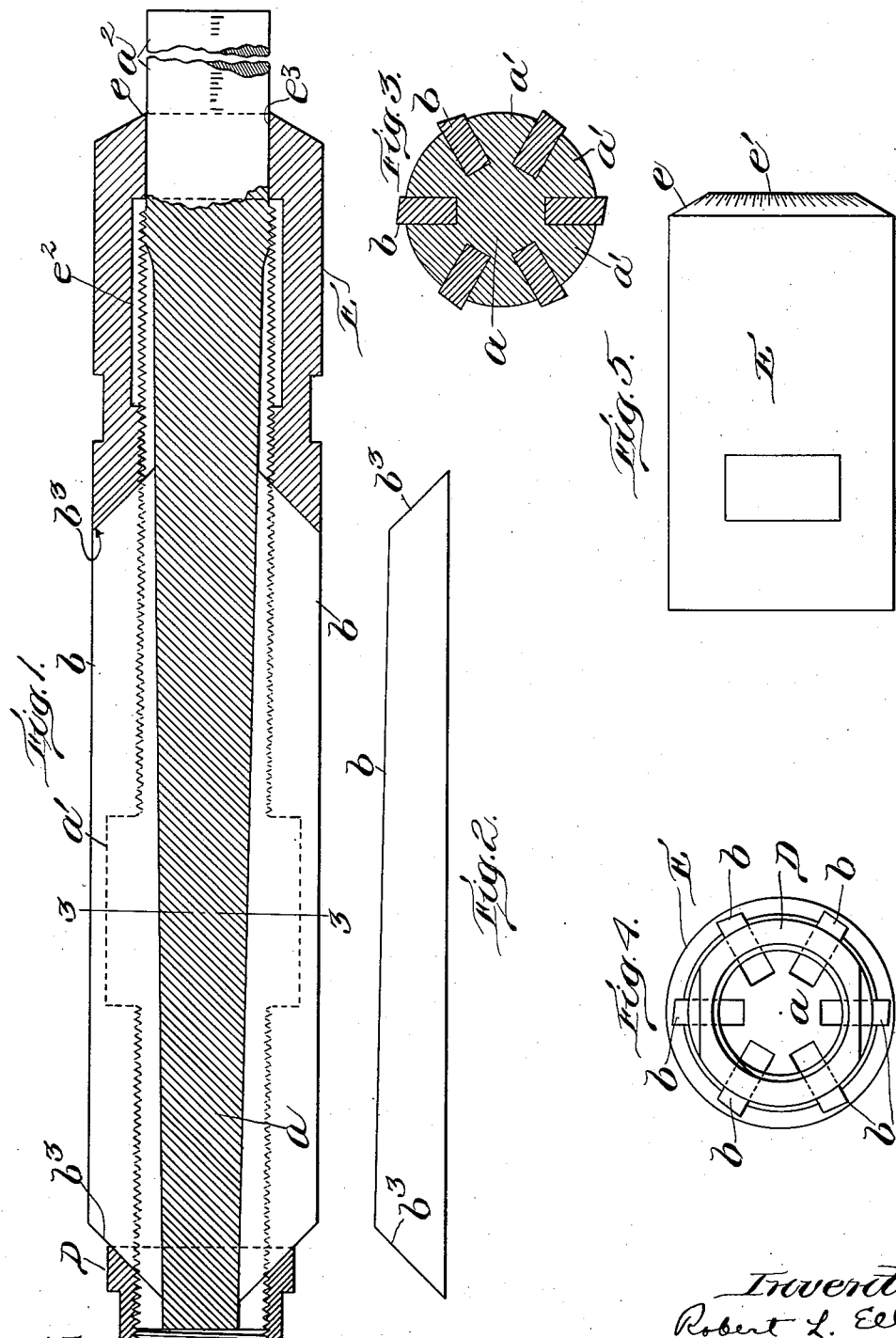
Witnesses:
Ida A. Eichorn
Agnes M. Shea.
Inventor:
Robert L. Ellery
by George A. Rockwell,
Atty.

UNITED STATES PATENT OFFICE.

ROBERT L. ELLERY, OF PORTSMOUTH, NEW HAMPSHIRE.

ADJUSTABLE REAMER.

1,077,463.  Specification of Letters Patent.  Patented Nov. 4, 1913.

Application filed August 17, 1912. Serial No. 715,624.

*To all whom it may concern:*

Be it known that I, ROBERT L. ELLERY, of Portsmouth, in the county of Rockingham and State of New Hampshire, have invented a new and useful Adjustable Reamer, of which the following is a specification.

The main object of my invention is to provide a reamer of simple construction whose adjustment can be more easily and accurately determined than heretofore and my invention consists essentially in providing one of the clamping nuts with a scale and having the nut extended so that its scale will be easily read in connection with a scale on the shank of the reamer.

Other inventional features will be pointed out below.

In the drawings: Figure 1 is partly section and partly elevation of a portion of a reamer embodying my invention; Fig. 2 is an elevation of one of the blades; Fig. 3 is a section on line 3—3 of Fig. 1; Fig. 4 is an end elevation looking from the left of Fig. 1; and Fig. 5 is an elevation of one of the clamping nuts.

A long cylindrical shank $a$ is provided with longitudinal shallow grooves cut at intervals around its periphery and extending for most of the length of the shank. These grooves are tapering and receive the radial blades $b$ which are shorter than the grooves so that by longitudinal adjustment along the grooves a greater or less effective diameter of the reamer as an entirety is secured. Each blade is beveled at both ends $b^3$ one of which projects beneath the outer adjusting nut D and the other of which projects beneath the inner adjusting nut E, each nut being beveled to engage the beveled faces of the blades.

I prefer to provide on shank $a$ between the threaded portions an enlargement $a'$ to reinforce the blades and I also prefer to have the inner portion of the shank of less diameter than the threaded portion.

Nut E is threaded at a portion of its interior to engage the threads of the shank but for a large portion of its interior surface it is not threaded but is extended to overhang the innermost threads on the shank, the inner diameter of the extended portion as at $e^2$ being larger than the diameter of the shank, while the diameter at $e^3$ is smaller than the diameter at $e^2$ so as to be approximately of the same diameter as the inner unthreaded portion of the shank. Nut E is beveled at its inner edge $e$ and carries a scale $e'$ graduated say into twenty-five equal parts to be read in connection with scale $a^2$ on the shank which may be marked with a graduated scale according to the scale on the nut.

The operation of my reamer will be clear from the foregoing description but it may be well to add that the scale $e'$ is always adjacent to the scale $a^2$ and therefore the reading will be easy and accurate.

Among the advantages of my invention I may point out that it is of a very simple construction having few parts, which are readily assembled and which are not at all likely to get out of order.

It will be noticed that shank $a$ has a threaded portion and an unthreaded portion of smaller diameter than the threaded portion and carries a longitudinal scale $a^2$ on the unthreaded portion. It will also be noticed that nut E has a portion $e^2$ extending over and inclosing the end threads of the shank but out of engagement with said threads, and at its end it has an internally projecting portion $e^3$ of smaller diameter than the threaded portion of the shank, this end portion of the nut inclosing the unthreaded portion of the shank and being adapted to engage the side of the outermost or end thread on the shank so as to limit the movement of said nut in one direction, the end portion carrying scale $e'$ above described. Nut E is between longitudinal scale $a^2$ and the blades, and scale $e'$ is prevented from moving in one direction out of adjacency to the scale on the shank by reason of the engagement of portion $e^3$ with the side of the end thread on the shank.

What I claim is:

1. An adjustable reamer comprising a shank with threads and having a portion of less diameter than the threaded portion said unthreaded portion having a longitudinal scale; blades mounted to move longitudinally on the shank; a nut to move the blades and threaded at one portion to engage the shank and having an internal projection to engage the side of the end thread of the shank and thereby limit the movement in one direction of said nut, the latter carrying a scale in adjacency to the scale on the shank.

2. An adjustable reamer comprising a shank having tapered grooves and having a threaded portion and an unthreaded portion of smaller diameter than the threaded portion and carrying a longitudinal scale; blades mounted to move longitudinally in said grooves; a nut to directly engage and thereby move the blades in the grooves and to hold them at one end to the shank, said nut having an inner threaded portion to engage the shank and having a portion extending over and inclosing the end threads of the shank but out of engagement with said threads and at its end having a portion of smaller diameter than the threaded portion of the shank, this end portion of the nut inclosing the unthreaded portion of the shank and being adapted to engage the side of the outermost thread on the shank to limit the movement in one direction of said nut, said end portion carrying a scale which is adjacent to the scale on the shank in whatever position the nut may be, said nut being between the longitudinal scale and the blades and the scale on the nut being prevented by the thread on the shank from moving in one direction out of adjacency to the scale on the shank.

ROBERT L. ELLERY.

Witnesses:
 WILLIAM E. MARVIN,
 MARION H. MARTIN.